United States Patent [19]

Doutsubo

[11] Patent Number: 4,642,704
[45] Date of Patent: Feb. 10, 1987

[54] VIDEO SIGNAL REPRODUCING APPARATUS USING PILOT SIGNAL SYSTEM

[75] Inventor: Nobuhide Doutsubo, Daito, Japan
[73] Assignee: Sanyo Electric Co., Ltd., Osaka, Japan
[21] Appl. No.: 707,344
[22] Filed: Mar. 1, 1985
[51] Int. Cl.⁴ .......................... G11B 21/10; G11B 5/45
[52] U.S. Cl. ...................................... 360/10.2; 360/27; 360/77; 360/10.1
[58] Field of Search ...................... 360/10.1, 10.2, 27, 360/77, DIG. 1; 369/47; 356/312, 335

[56] References Cited

U.S. PATENT DOCUMENTS 4,106,065  8/1978  Ravizza .
4,297,733  10/1981  Sanderson .
4,581,658  4/1986  Azuma et al. ....................... 360/10.2
4,587,580  5/1986  Takayama et al. .................... 360/77

Primary Examiner—Aristotelis M. Psitos
Attorney, Agent, or Firm—Armstrong, Nikaido, Marmelstein & Kubovcik

[57] ABSTRACT

A video signal reproducing apparatus comprises an error signal forming circuit (31) for providing an error signal (f) for tracking control and a movable head controlling circuit (34) for positioning control of movable heads based on the error signal (f). When still reproduction is started and a still reproduction instructing signal (c) is applied to a four-field pulse generating circuit (35), the movable head controlling circuit (34) is disabled by a detection period signal (d) of the high level in a four-field period provided from the circuit (35) to forbid the positioning control of the movable heads and an error signal (f) is formed by specified pilot signals reproduced from the movable heads where the positioning control is forbidden as well as by reference signals $f_1$ to $f_4$ selected successively. A still control signal generating circuit 40 determines and provides as output two reference signals most suitable for still reproduction based on the above stated error signal (f). When a four-field period has passed after the start of still reproduction, an error signal (f) is generated based on the determined reference signals and positioning of the movable heads is controlled based on the error signal.

9 Claims, 33 Drawing Figures

FIG.5
FIG.6
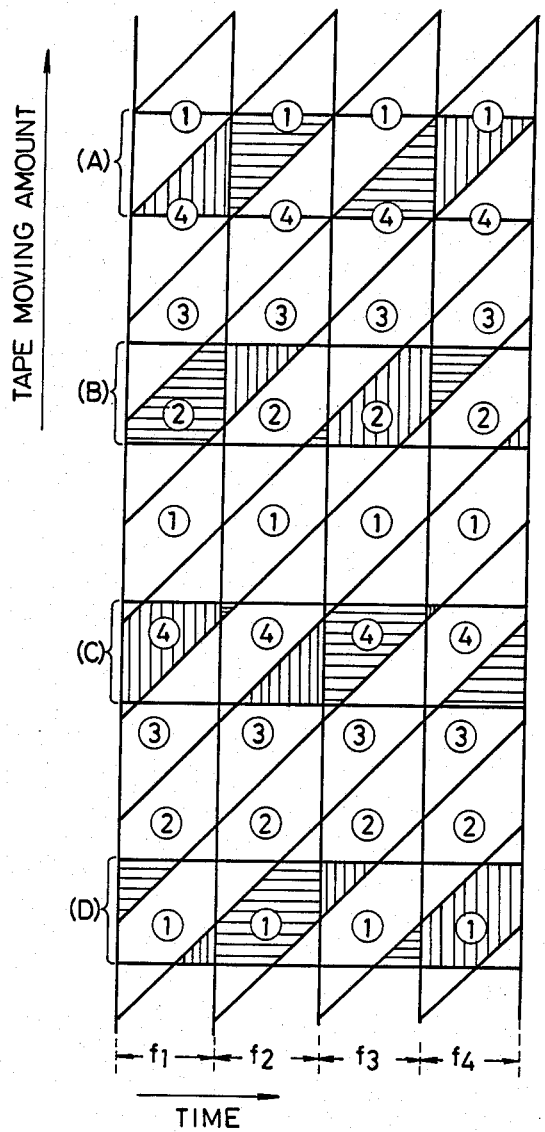
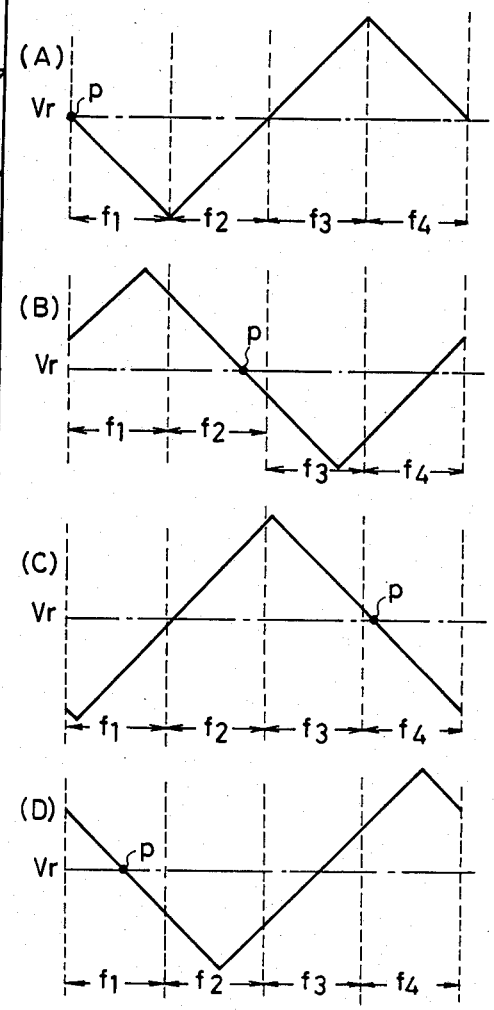

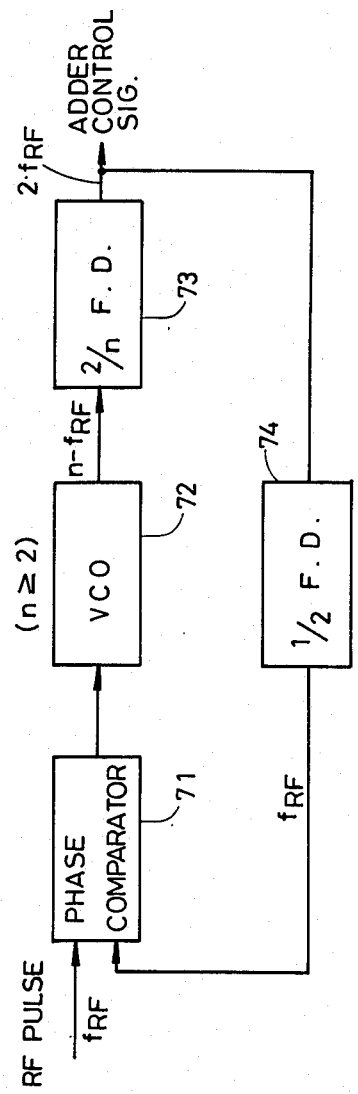

VIDEO SIGNAL REPRODUCING APPARATUS USING PILOT SIGNAL SYSTEM

BACKGROUND OF THE INVENTION

1. Field of the Invention

The present invention relates to an apparatus for reproducing a video signal recorded in a recoding medium such as a magnetic tape or the like by a helical scanning system, in which a rotating two head system is adopted together with a DTF system in a head portion and the so-called pilot signal system is employed for tracking control. Particularly, the present invention relates to a video signal reproducing apparatus in which an improvement is made in still reproduction control so that noise at the time of still reproduction can be diminished.

2. Description of the Prior Art

An example of a tracking control method using the so-called pilot signal system in which positioning of reproducing heads is controlled based on pilot signals recorded in an overlapping manner with a video signal is proposed in U.S. Pat. No. 4,297,733. In such a pilot signal system, for example, four kinds of tracking pilot signals $f_1$, $f_2$, $f_3$ and $f_4$ having different frequencies are applied. The pilot signals $f_1$ to $f_4$ are selected by a field period and recorded in an overlapping manner with a video signal. As for the frequencies of the pilot signals, the frequency of the first signal $f_1$ is 102.544 kHz, that of the second signal $f_2$ is 118.951 kHz, that of the third signal $f_3$ is 165.210 kHz and that of the fourth signal $f_4$ is 148.689 kHz, for example. These pilot signals are recorded in a specified order in which a difference between the frequency of a pilot signal on one video track and that of a pilot signal on one adjacent track is approximately 16 kHz and a difference between the frequency of the above mentioned pilot signal and that of a pilot signal on the other adjacent track is approximately 46 kHz.

Using these pilot signals, tracking control for reproduction is performed in the below described manner. When a reproduced track is scanned by a reproducing head, the pilot signals recorded on the left and right tracks adjacent to the scanned track are also read to some extent due to a side-read effect of the reproducing head. For example, if the pilot signal $f_1$ is recorded on the reproduced track, the pilot signals $f_4$ and $f_2$ recorded on both adjacent tracks are also read out besides the pilot signal $f_1$. Then, a reference signal $f_1$ having a frequency equivalent to that of the tracking pilot signal $f_1$ on the reproduced track is fed into the pilot signals thus read out. As a result, beats are generated between the crosstalk components $f_4$ and $f_2$ from the adjacent tracks and the reference signal $f_1$. Accordingly, if these beats are extracted and a comparison is made between the level of a beat component of 46 kHz and the level of a beat component of 16 kHz, tracking error can be detected. More specifically, in case of normal tracking of the reproducing head, the output levels of the pilot signals read out from the right and left tracks are equal and accordingly the beat component of 46 kHz and the beat component of 16 kHz generated respectively between the reproduced pilot signals and the injected reference signal have the same level. On the other hand, in case where the reproducing head is closer to either of the adjacent tracks, the levels of the above stated beat components are not equal. As a result, a tracking error can be detected. Thus, based on the detection, servo control of a tape sending system such as a capstan is performed.

U.S. Pat. No. 4,106,065 discloses an example of the so-called DTF system in which positioning of a magnetic head is controlled by a control signal with the magnetic head being attached to a bimorph or a piezoelectric bender or the like.

Such DTF system is a control system which is particularly utilized for special modes of reproduction such as the so-called cue reproduction (forward fast reproduction for searching), rewinding reproduction and the like. In case of such a special mode of reproduction, as is different from the ordinary mode of reproduction, scanning of a reproducing heads is not applied only along a desired recorded track, but is also applied in a manner crossing a plurality of recorded tracks. As a result, the scanning locus of the reproducing heads cannot be made to coincide with the recorded tracks only by the control of the tape sending system and the like. For this reason, by means of a control mechanism of the DTF system, control is made such that the reproducing heads are moved in the transversal direction of the tracks based on an error signal obtained as a mixed signal of the reproduced pilot signals and the reference signal, whereby the reproducing heads scan accurately the recorded tracks.

However, at the time of still reproduction, which is one of the special forms of reproduction, travelling of the magnetic tape is completely stopped and scanning of the reproducing heads are applied in a manner in which the reproducing heads cross a plurality of specified recorded tracks. As a result, in such a conventional reproducing apparatus, a plurality of pilot signals are reproduced by the reproducing heads and disadvantages are involved that it is difficult and takes much time to determine which signal out of those pilot signals has frequency coincident with the frequency of the reference signals to be supplied in order to obtain an error signal most suitable for the DTF control of the reproducing heads.

A more concrete description will be made in the following. FIG. 1 is a block diagram showing an example of an error signal forming circuit for providing an error signal to two reproducing heads of a rotating two head system, including a mechanism for the DTF system (these two reproducing heads being referred to hereinafter as "movable heads" including the DTF mechanism; In case where this invention is applied to a video signal recording and reproducing apparatus, the movable heads are adapted to have a double function of recording and reproduction). Referring to FIG. 1, signals reproduced by both movable heads are supplied from a reproduced signal input terminal 1 to a filter 2. Reproduced pilot signals are extracted from the reproduced signals through the filter 2 and the extracted reproduced pilot signals are supplied to a mixer 3. On the other hand, through a control signal input terminal 4, a 2-bit control signal is applied to a reference signal generating circuit 5. The reference signal generating circuit 5 selects successively reference signals $f_1$ to $f_4$ in response to the control signal and supplies the reference signals to the mixer 3. The mixer 3 mixes the successively selected reproduced pilot signals and reference signals and supplies the mixed signals to a bandpass filter 6 of 16 kHz and to a bandpass filter 7 of 46 kHz, respectively. The signal components extracted by the bandpass filters 6 and 7 are detected by AM detectors 8 and 9, respectively, so as to be compared by a comparator 10. The output of the comparator 10 is supplied, on one hand, directly to a switch 11 and on the other hand to the switch 11 through an inverter 12. The switch 11 is turned to either side alternately in response to the RF pulse for head selection applied from a head selection signal input terminal 13. Consequently, an error signal for DTF control and tracking control is provided from an error signal output terminal 14.

It is for the below described reasons that the polarity of the error signal is thus inverted in response to the selection of a head. In one of the reproducing heads, a signal component of 46 kHz for example increases when the scanning position deviates in the tape travelling direction, and a signal component of 16 kHz increases when the tracing position deviates in the opposite direction. On the contrary, in the other reproducing head, a signal component of 16 kHz increases when the scanning position deviates in the tape travelling direction, and a signal component of 46 kHz increases when the scanning position deviates in the opposite direction. Accordingly, by inverting the polarity of the error signal for each head, it can be automatically determined that when a signal component of 46 kHz increases in the error signal, the scanning position of the head deviates in the tape travelling direction, and that the scanning position of the head deviates in the direction opposite to the tape travelling direction when a signal component of 16 kHz increases.

In the following, description will be made of a conventional method of control of the above described error signal forming circuit in the still reproduction mode.

Let us assume that in the ordinary reproduction mode, one of the two movable heads scans the tracks where the pilot signals having frequencies $f_1$ and $f_3$ are recorded, that the other movable head scans the tracks where the pilot signals having frequencies $f_2$ and $f_4$ are recorded, and that travelling of the tape is stopped in response to the instruction of still reproduction. Then, the control signal applied from the control signal input terminal 4 changes and, as a result, the reference signal generating circuit 5 operates in the following manner for the first several frames. Specifically stated, a reference signal having frequency $f_1$ is provided from the generating circuit 5 to the mixer 3 while one of the movable head scans the tracks where the pilot signals $f_1$ or $f_3$ are recorded and a reference signal having frequency $f_2$ is provided from the generating circuit 5 to the mixer 3 while the other movable head scans the tracks where the pilot signals $f_2$ or $f_4$ are recorded.

Consequently, in the period of the first several frames after the start of still reproduction, the pilot signal $f_1$ or $f_3$ reproduced by one movable head is mixed with the reference signal $f_1$ by means of the mixer 3 and the pilot signal $f_2$ or $f_4$ is mixed with the reference signal $f_2$ by means of the mixer 3.

An output signal of the mixer 3 is supplied to the AM detecting circuit 8 through the 16 kHz bandpass filter 6, in the same manner as described above, as well as to the AM detecting circuit 9 through the 46 kHz bandpass filter 7. Then, by means of the comparator 10, the outputs of both detecting circuits 8 and 9 are compared to generate an error signal.

As this time, if one movable head scans the track where the pilot signal $f_1$ is recorded and the other movable head scans the the track where the pilot signal $f_2$ is recorded, the output signal of the mixer 3 becomes 0 and the error signal to be described below also becomes 0.

However, since the travelling of the tape is stopped at the time of still reproduction, the scanning loci of both movable heads maintained in the ordinary reproduction positions deviate from the tracks where the signals are recorded.

FIG. 2 illustrates an example in which scanning loci and recorded tracks do not coincide. At the time of still reproduction, as shown in FIG. 2 for example, the movable heads scan slantingly the tracks 17, 18 and 19 where the pilot signals $f_3$, $f_4$ and $f_1$ are recorded. Accordingly, the scanning loci are shown as a double hatched region denoted by the reference numeral 20. The reference numerals 15 and 16 in FIG. 2 denote tracks where the pilot signals $f_1$ and $f_2$ are recorded, respectively. The reference numeral 21 in FIG. 2 denotes a magnetic tape.

Thus, the pilot signals reproduced by both movable heads comprise the pilot signals having frequencies $f_3$, $f_4$ and $f_1$, respectively.

Accordingly, the output signal of the mixer 3 based on the pilot signals $f_3$, $f_4$ and $f_1$ reproduced by one movable head and the reference signal $f_1$ becomes a beat signal having a frequency equivalent to the difference between the reproduced pilot signal $f_4$ and the reference signal $f_1$, namely, 46 kHz, and the output signal of the mixer 3 based on the pilot signals $f_3$, $f_4$ and $f_1$ reproduced by the other movable head and the reference signal $f_2$ becomes a beat signal having a frequency equivalent to the difference between the reproduced pilot signal $f_3$ and the reference signal $f_2$, namely, 46 kHz. The reason is that if the frequency of a reproduced pilot signal and the frequency of a reference signal are equal, or if the frequency difference between both signals is other than 16 kHz or 46 kHz (caused by $f_3$ and $f_1$ or $F_4$ and $f_2$), the beat signals are removed through the bandpass filters 6 and 7.

As a result, the level of the detected signal provided from the detecting circuit 8 becomes approximately 0 and the level of the detected signal of 46 kHz provided from the detecting circuit 9 increases. Accordingly, the output signal of the comparator 10 which compares both detected signals is a negative output signal proportional to the difference of levels of the two detected signals. Subsequently, in the same manner as described above, an output directly provided from the comparator 10 and an output obtained from the inverter 12 which inverts the output of the comparator 10 are selected alternately by the switch 11 for each field, so that an error signal turning positive and negative consecutively can be obtained. With a positive error signal, one movable head is controlled and with a negative error signal, the other movable head is controlled. Thus, based on both error signals, the positioning of both movable heads is controlled. More specifically, based on the level of the error signal, the position of the movable heads are moved, so that the level of the error signal may be decreased.

The level of the components of the frequencies $f_3$ and $f_4$ of the pilot signals reproduced by the two movable heads change all the time according to the scanning of the movable heads.

However, even if the reference signals $f_1$ and $f_2$ continue to be applied, the scanning locus 20 of the heads deviates considerably from the tracks 19 and 16 where the pilot signals $f_1$ and $f_2$ are recorded. As a result, the positioning control of the movable heads based on the error signal cannot be made satisfactorily. Accordingly, when the reference signals $f_1$ and $f_2$ are applied, an error signal continues to be supplied from the output terminal 14 since the positioning the movable heads cannot be controlled adequately.

Then, for the subsequent several frames, the frequencies of the reference signals provided from the generating circuit 5 to the mixer circuit 3 are changed to $f_1$ and $f_4$.

If an error signal still continues to be supplied after the change of the frequencies of the reference signals to $f_1$ and $f_4$, the frequencies of the reference signals provided from the generating circuit 5 to the mixer circuit 3 are changed to $f_3$ and $f_4$ in a period of the further subsequent several frames.

Then, in the case of FIG. 2, the movable heads are controlled to be placed in the most suitable positions when the frequencies of the reference signals are changed to $f_3$ and $f_4$.

FIG. 3 shows a state where the movable heads are controlled to be in the most suitable positions. As shown in FIG. 3, one movable head (the scanning locus thereof being denoted by the reference numeral 22) scans the track 17 where the pilot signal of the frequency $f_3$ is recorded, and the other movable head (the scanning locus thereof being denoted by the reference numeral 23) scans the track 18 where the pilot signal of the frequency $f_4$ is recorded, the level of the error signal at this time being approximately 0.

When the level of the error signal becomes almost 0, the generating circuit 5 stops the change of the frequencies of the reference signals and then, noiseless still reproduction is made.

However, as is clearly understood from the foregoing description, such a conventional control method involves disadvantages that it takes much time to control the positioning of the movable heads most suitably and noiseless still reproduction cannot be made promptly.

SUMMARY OF THE INVENTION

The present invention aims to provide a video signal reproducing apparatus in which responsiveness for still reproduction operation is excellent and a clear picture of still reproduction can be obtained.

Briefly stated, a video signal reproducing apparatus in accordance with the present invention forbids the position control of the reproducing heads in a DTF system in response to a still reproduction start signal and feeds reference signals in this forbidden period by changing the frequency thereof for each field so that the most suitable reference signal for still reproduction can be determined.

In a preferred embodiment of the present invention, four pilot signals having frequencies $f_1$ to $f_4$, respectively, are utilized. Accordingly, the above described period for forbidding the position control of the heads in the DTF system can be selected to be a 4-field period.

Consequently, in an apparatus in accordance with the present invention, the optimum reference signals can be determined in such a short period as a 4-field period and, therefore, the responsiveness to the still reproduction start signal is excellent and a clear picture can be obtained by still reproduction.

Generally, the period for forbidding the head positioning control in the DTF system can be made to be a period corresponding to the number of pilot signals adopted by the pilot signal system.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 5 consisting of (A)–(D) shows various examples of the relative positional relation between the scanning locus of the movable heads and the recorded tracks at the time of still reproduction;

FIG. 6 is a waveform diagram of error signals generated in the respective positional relations shown in FIG. 5;

FIG. 9 shows reference signals determined by the 2-bits ($A_0$, $A_1$) control signals;

FIG. 10 is a block diagram showing an example of a structure of an, adder control signal generating circuit;

DESCRIPTION OF THE PREFERRED EMBODIMENTS

First, with reference to an embodiment of the present invention, a principle of detection of adequate reference signals for still reproduction control will be described.

Figure 1:
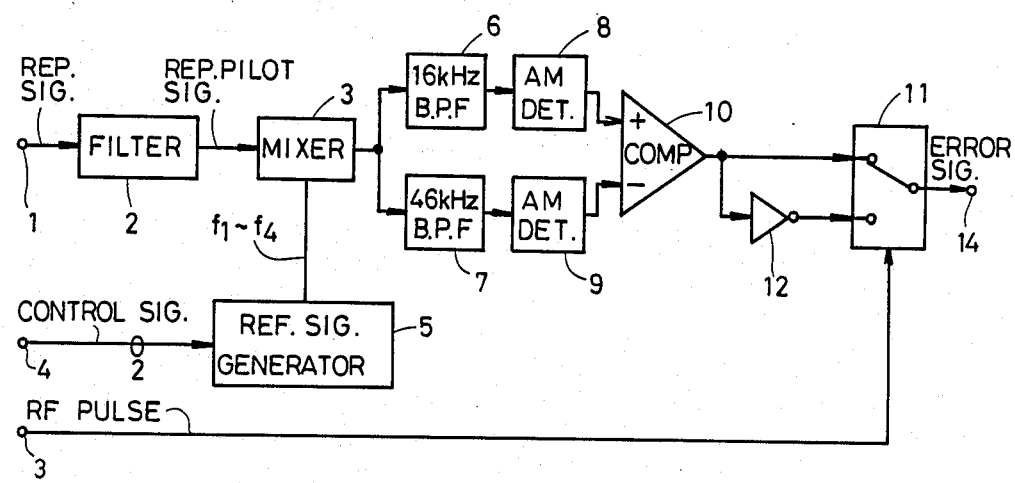
FIG. 1 is a block diagram showing an example of an error signal forming circuit for generating an error signal for tracking control.
Figure 2:
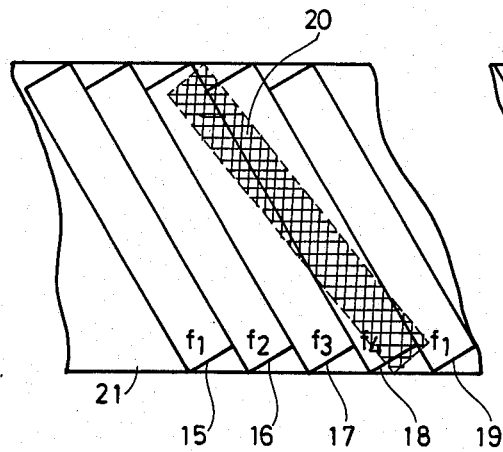
FIG. 2 is an illustration showing an example in which DTF control is not made and the scanning loci of movable heads (reproducing heads) deviate from the recorded tracks.

Referring to FIGS. 1 and 2, it is assumed that the tape is stopped in the position shown in FIG. 2 when still reproduction starts. In this case, a capstan for sending the tape is disabled and, as a results, an error signal from the output terminal 14 in FIG. 1 for phase control of the capstan is, as a matter of course, not supplied to the capstan servo system (not shown).

Figure 4:
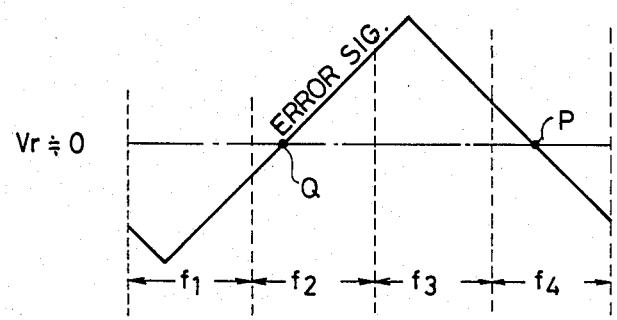
FIG. 4 is a waveform diagram of an error signal obtained in the positional relation shown in FIG. 2 between the recorded tracks and the head scanning locus.

The essential feature of this embodiment resides in that the position control of both movable heads based on the error signal provided from the output terminal 14 shown in FIG. 1 is forbidden in response to the start of still reproduction and that the frequency of the reference signals provided from the reference signal generating circuit 5 to the mixer 3 is changed successively for one field in the order of $f_1$, $f_2$, $f_3$ and $f_4$. If such change of the frequency is repeated in a prescribed period corresponding to 4 field or more, for example, in a 4-field period, the level of the error signal changed as shown by the solid line in FIG. 4. At this time, the average level $V_r$ of the error signal in the 4-field period shown by the chained line in FIG. 4 is nearly equal to the zero level of the output of the comparator 10 in FIG. 1.

In this case, the point where the level of the error signal coincides with the average level $V_r$, namely, approximately the zero level, is the point "P" or the point "Q". A reference signal applied when the falling change of the error signal reaches the point P coincident to the average level $V_r$ is a signal having the frequency $f_4$ and it can be understood from FIG. 2 that the reference signal $f_4$ is a suitable reference signal necessary for still reproduction by one of the movable heads.

From FIG. 2, it can be seen that a reference signal applied in succession in time with respect to the reference signal $f_4$, namely, either the reference signal $f_3$ applied immediately before the reference signal $f_4$ or the reference signal $f_1$ immediately after the reference signal $f_4$ is a suitable reference signal necessary for still reproduction by the other movable head. Then, referring to FIGS. 2 and 4, it is understood that the reference signal $f_3$ closer to the point "P" is the necessary reference signal.

In other words, for still reproduction, both movable heads scan slantingly two or three adjacent tracks respectively in the tape as shown in FIG. 2. If the position control of the heads is first forbidden and the frequency of the reference signals to be applied is changed in the order of $f_1$, $f_2$, $f_3$ and $f_4$, it follows that at the time of scanning of either movable head, a reference signal necessary for optimum position control of the movable head is applied at least once. Since the change of the output signal of the mixer 3 shown in FIG. 1 decreases and the change of the error signal falls to the average level $V_r$ at this time, the most suitable reference signal for one movable head can be detected at the point "P" where the falling change of the error signal coincides with the average level $V_r$, and the reference signal closer to the point "P" can be detected as the most suitable reference signal for the other movable head.

This embodiment is structured based on the above described principle of detection of suitable reference signals.

Referring now to FIGS. 5 and 6, various patterns of error signals caused by the different relative positional relations between the scanning loci of the movable heads and the recorded tracks on the tape will be described in the following.

Figure 3:
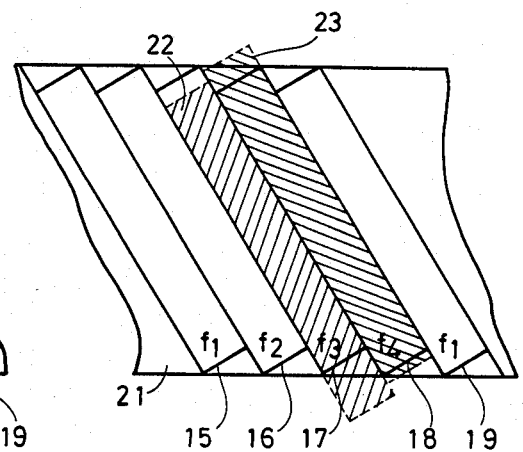
FIG. 3 is an illustration showing a state in which the DTF control is made in the case of FIG. 2 and the movable heads are controlled to be in the most suitable positions.

FIG. 5 shows relations between the patterns of the recorded tracks and the scanning loci of the heads represented by the so-called "track pattern coordinate system", as is different from FIGS. 2 and 3.

The track pattern coordinate system is proposed in "National Technical Report Vol. 28 No. 3 June 1982" by Nobuyoshi Yokobori et al.

In the track pattern coordinate system, vertical lines represent tapes, which travel vertically and are aligned adjacent to each other in the horizontal direction. A track pattern represented as being slanted upward to the right on the tape is moved for one track pitch each time a tape moves from the left to the right. Accordingly, in this coordinate system, the track patterns and the head scanning loci can be regarded as a single continual line locus. Furthermore, since it means that the abscissa represents the time and the ordinate represents the moved position on the tape, the time, the moving amount of the heads on the tape and other data can be read at once.

In case of making still reproduction, the relative positional relation between the recorded tracks and the scanning loci of the movable heads is any one of the patterns (A), (B), (C) and (D) in FIG. 5. The relation (A) represents a relation in which the movable heads scan the tracks (1) and (4); the relation (B) represents a relation in which the movable heads scan the tracks (2) and (3); the relation (C) represents a relation in which the movable heads scan the tracks (3) and (4); and the relation (D) represents a relation in which the movable heads scan the tracks (1) and (2). The numerals (1) to (4) given to the respective tracks correspond to the numerals given to the pilot signals $f_1$ to $f_4$ recorded in the respective tracks.

FIG. 6 shows waveforms of the error signals generated in the cases (A) to (D) in FIG. 5, (A) to (D) in FIG. 6 corresponding to (A) to (D) in FIG. 5.

In the following, the respective cases will be described specifically. The error signal in the scanning position in (A) of FIG. 5 changes as shown by the solid line in (A) of FIG. 6 and the frequency of the reference signal at the point "P" of coincide between the falling change of the error signal and the average level $V_r$ becomes $f_1$.

The error signal in the scanning position in (B) of FIG. 5 changes as shown by the solid line in (B) of FIG. 6 and the frequency of the reference signal at the point P of coincidence between the falling change of the error signal and the average level $V_r$ becomes $f_2$.

The error signal in the scanning position in (C) of FIG. 5 changes as shown by the solid line in (C) of FIG. 6 and the frequency of the reference signal at the point "P" of coincidence between the falling change of the error signal and the average level $V_r$ becomes $f_4$.

The error signal in the scanning position in (D) of FIG. 5 changes as shown by the slide line in (D) of FIG. 6 and the frequency of the reference signal at the point "P" of coincidence between the falling change of the error signal and the average level $V_r$ becomes $f_1$.

Under these conditions, a desired object can be attained if a circuit is structured such that an error signal provided from the output terminal 14 of the error signal generating circuit in FIG. 1 for example is applied to the positioning control portions of both movable heads through a forbidding gate circuit and that in a period of at least 4 fields after the start of still reproduction, the positioning control of the movable heads is forbidden by stopping the application of the error signal by the forbidding gate circuit.

Instead of using the forbidding gate circuit, the positioning control of the movable heads can also be forbidden in the above stated prescribed period by processing of software by microcomputer for example.

Figure 7:
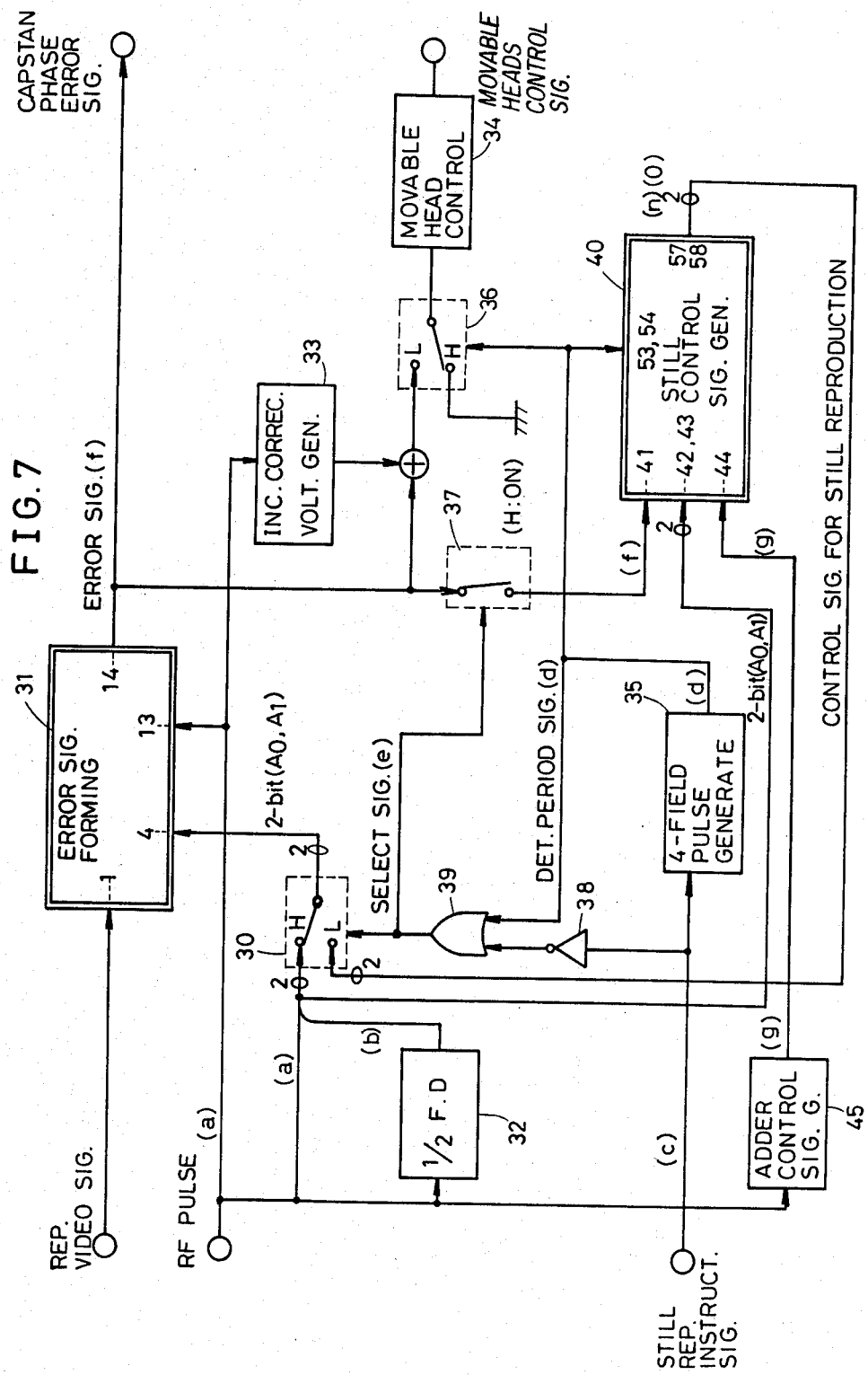
FIG. 7 is a block diagram showing a structure of a main part of an embodiment in accordance with the present invention.
Figure 8:
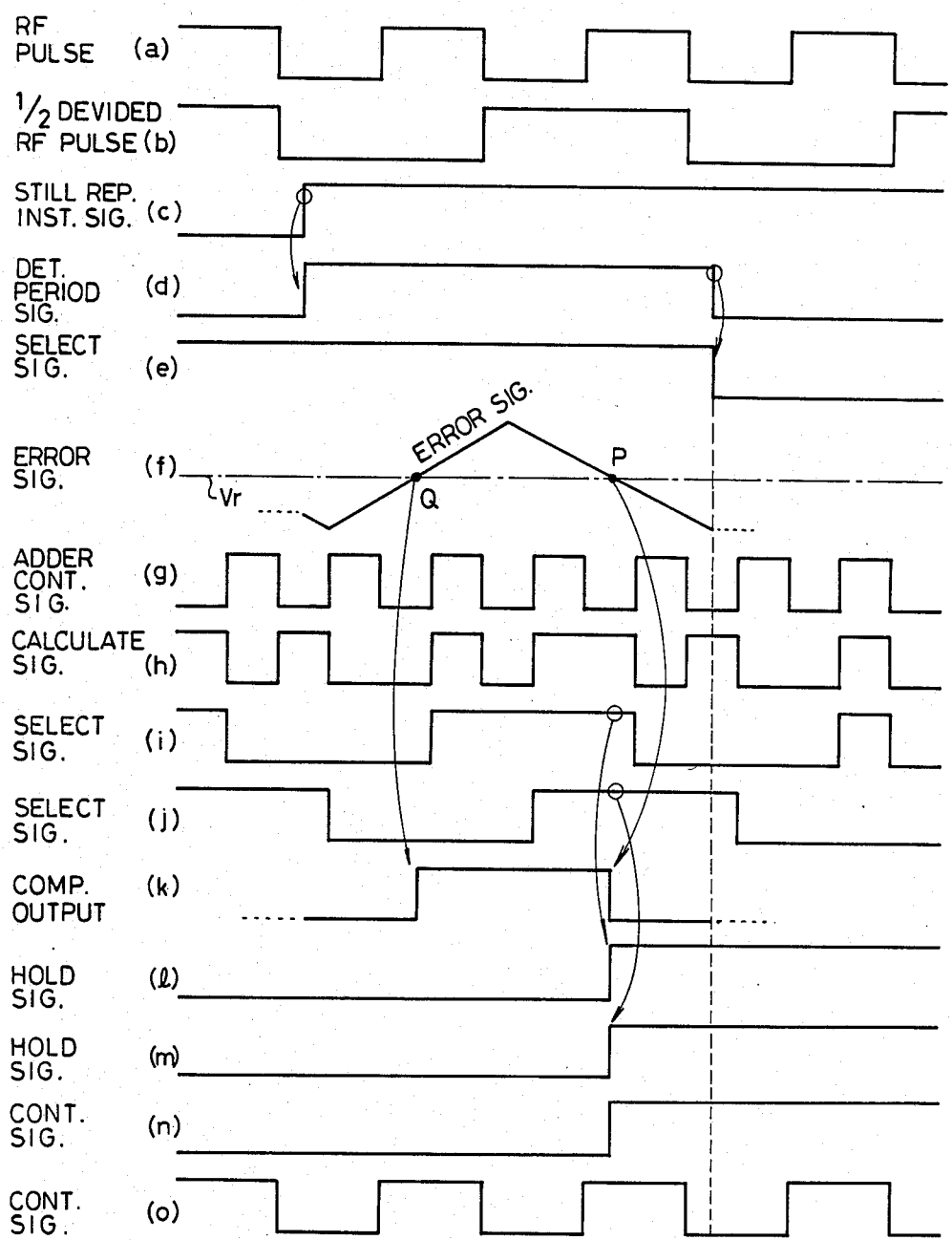
FIG. 8 consisting of (A)–(D) shows waveform of the signals in the respective portions of the circuit shown in FIG. 7.

FIG. 7 is a block diagram showing a structure of a main part of an embodiment of the present invention. FIG. 8 shows signal waveforms in the respective portions in the FIG. 7 circuit. The signals (a) to (o) in FIG. 8 represent the signal changes in the portions (a) to (o) shown in FIG. 7 (and in FIG. 10 to be described below).

Referring to FIGS. 7 and 8, a video signal (including pilot signals) reproduced from a magnetic tape by means of two movable heads not shown is supplied to a reproduced signal input terminal 1 of an error signal forming circuit 31. The error signal forming circuit 31 is the same as the circuit described previously in connection with FIG. 1. In the error signal forming circuit 31, an RF pulse (a) is applied to an RF signal input terminal 13 thereof and a control signal is applied to a control signal input terminal 4 thereof.

The RF pulse (a) is a head selection pulse which changes for each field. The control signal is a 2-bit signal obtained in the ordinary reproduction mode by a combination of the state $A_0$ of the high level or the low level of the RF pulse (a) and the state $A_1$ of the high level or the low level of the pulse (b) frequency divided by a ½ frequency divider 32. The 2-bit ($A_0$, $A_1$) control signal is selected by the switch 30 in the ordinary reproduction mode.

In the reference signal generating circuit 5 (see FIG. 1) of the error signal forming circuit 31, reference signals $f_1$, $f_2$, $f_3$ and $f_4$ are successively selected to be provided as an output based on the levels of the 2-bit ($A_0$, $A_1$) control signal.

For example, by a combination of the states $A_0$ and $A_1$, each of the high level or the low level, of the control signal as shown in FIG. 9, the reference signals $f_1$, $f_2$, $f_3$ and $f_4$ can be determined.

Further referring to FIGS. 7 and 8, an error signal obtained by the error signal forming circuit 31 is utilized as a capstan phase error signal for control of the tape travelling driving system (not shown) and is also utilized for DTF control as a movable head control signal provided through the movable head control circuit 34 by adding thereto an output of an inclination correction voltage generating circuit 33.

The inclination correction circuit 33 is a circuit for generating triangular waves for correcting the difference between the inclination of track patterns and that of scanning loci of movable heads on the magnetic tape. The circuit 33 is controlled by the RF pulse (a). Accordingly, the triangular waves are generated for a field period in synchronism with the RF pulse (a) so that the track patterns and the scanning patterns may be parallel. The circuit 33 does not generate triangular waves in the ordinary reproduction mode and changes the inclination and the like of the triangular waves generated in a special reproduction mode (for example a cue reproduction mode etc.) other than the still reproduction mode.

When the still reproduction mode is selected by an operator using a manual switch, not shown, a still reproduction instruction signal (c) of the high level is supplied to the 4-field pulse generating circuit 35. The 4-field pulse generating circuit 35 provides a detection period signal (d) of the high level for a 4-field period in synchronism with the rise of the still reproduction instructing signal (c). As a result, the switch 36 is turned to the "H" side, whereby the control of the movable heads by the movable head control circuit 34 is forbidden for the 4-field period.

The still reproduction instructing signal (c) and the detection period signal (d) are applied also as selection signals of the switch 30 and the switch 37. The instructing signal (c) of the high level is inverted to attain the low level by the inverter 38 and the signal (c) of the low level is supplied to one input of an OR gate 39. The detection period signal (d) of the high level is supplied to the other input of the OR gate 39, in the 4-field period. Accordingly, a selection signal (e) provided from the OR gate 39 is maintained at the high level in the 4-field period after the start of still reproduction in the same manner as before the start of still reproduction.

As a result, in the 4-field period after the start of still reproduction, the switch 30 is maintained on the "H" side and a 2-bit ($A_0$, $A_1$) control signal comprising signals (a) and (b) is supplied to the error signal forming circuit 31. Consequently, the reference signals $f_1$ to $f_4$ are successively selected for each field in this 4-field period.

The error signal provided from the output terminal 14 of the error signal forming circuit 31 in the 4-field period after the start of still reproduction has a waveform shown as (f) in FIG. 8, for example. For the purpose of facilitating the explanation, this error signal (f) is made to coincide with the error signal in case where travelling of the tape is stopped in the position shown in FIG. 2.

The error signal (f) provided from the error signal forming circuit 31 is supplied to the input terminal 41 of the still control signal generating circuit 40 through the switch 37, since the switch 37 is turned on during the high level period of the selection signal (e).

The RF pulse (a) and the ½ frequency divided pulse (b) are supplied to the two bit input terminals 42 and 43, respectively, of the still control signal generating circuit 40. An adder control signal (g) having a frequency two times as large as the RF pulse (a) is generated in the adder control signal generating circuit 45 to be supplied to the input terminal 44.

The adder control signal generating circuit 45 is structured for example as shown in FIG. 10. Referring to FIG. 10, a phase closed loop circuit is structured by series connection of a phase comparing circuit 71, a VCO 72 for multiplying frequency by "n" and a 2/n frequency divider 73 as well as by a feedback loop of a ½ frequency divider 74. Thus, a control signal (g) having a frequency exactly two times as large as the RF pulse (a) can be formed.

Figure 11:
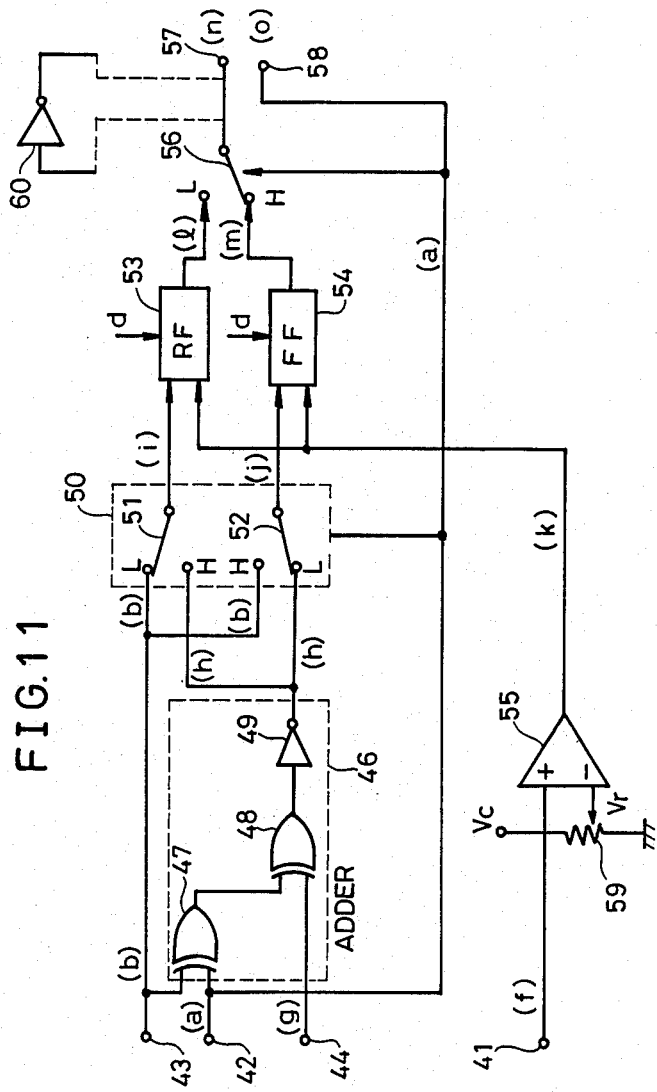
FIG. 11 is a block diagram showing an example of a specific circuit structure of a still control signal generating circuit.

FIG. 11 is a block diagram showing an example of a specific structure of the still control signal generating circuit 40. The reference numeral attached to the respective input and output terminals are identical to the numerals of the corresponding terminals in FIG. 7.

Referring to FIGS. 11 and 8, pulse signals (a), (b) and (g) supplied to the input terminals 42, 43 and 44 undergo a prescribed calculating operation in the adder circuit 46. The adder circuit 46 comprises two exclusive OR gates (hereinafter referred to as EXOR) 47 and 48 and an inverter 49. In the adder circuit 46, first, an exclusive ORed output of the RF pulse (a) and the ½ frequency divided pulse (b) is evaluated by the EXOR 47. Then, the exclusive ORed output of the output signal of the EXOR 47 and the adder control signal (g) is evaluated by the EXOR 48 and the output signal of the EXOR 48 is inverted by the inverter 49 so as to be provided as a signal (h).

The signal (h) and the pulse signal (b) applied from the input terminal 43 are supplied to a switching circuit 50. The switching circuit 50 comprises two associated switches 51 and 52 changed over in a ganged fashion in response to the RF pulse (a). When the RF pulse (a) is at the high level, the signal (h) is selected by the switch 51 and the signal (b) is selected by the switch 52. On the contrary, when the RF pulse (a) is at the low level, the signal (b) is selected by the switch 51 and the signal (h) is selected by the switch 52. The signals selected by the switch 51 and the switch 52 are supplied to the data input terminals of the flip-flops 53 and 54 as a signal (i) and a signal (j), respectively.

On the other hands, the error signal (f) applied from the input terminal 41 is supplied to the "+" input of the comparator 55. A predetermined reference voltage regulated by a variable resistor 59 is applied to the "−" input of the comparator 55. Then, the comparator 55 compares the change of the error signal shown by the solid line (f) in FIG. 8 and the average level $V_r$ shown by the chained line and provides a coincidence detection signal shown by (k) in FIG. 8. More specifically, the variable resistor 59 connected to the "−" input terminal of the comparator 55 is regulated to generate a reference voltage $V_r$ equivalent to the average level of the error signal (f). The error signal (f) applied from the "+" input terminal of the comparator 55 is compared with the reference voltage $V_r$. The comparator 55 provides the coincidence detection signal (k) having a waveform rising to the high level when the rising change of the error signal (f) coincides with the average level $V_r$ and falling to the low level when the falling change of the error signal (f) coincides with the average level $V_r$.

Figure 12:
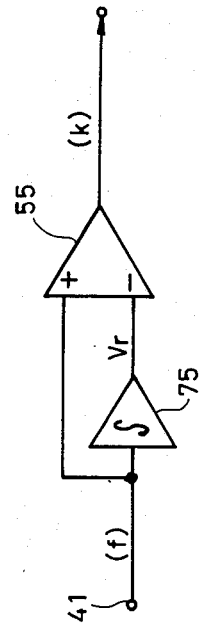
FIG. 12 shows an integrator circuit that can be used in the circuit of FIG. 11.

The reference voltage $V_r$ in the comparator 55 can also be set by using an integrating circuit 75 as shown in FIG. 12 instead of using the above described variable resistor 59. Referring to FIG. 12, the integrating circuit 75 is connected such that the error signal (f) applied from the input terminal 41 is supplied directly to the "+" input terminal of the comparator 55 and is also supplied to the "−" input terminal of the comparator 55 through the integrating circuit 75. The integrating circuit 75 serves to average the changes of the error signal (f) supplied from the input terminal 41 and to provide the average level $V_r$. Accordingly, in the above described structure, the average level of the error signal (f) needs be obtained by the integrating circuit 75 in a period of four fields for example after the start of still reproduction and the coincidence detection signal (k) needs be obtained by the comparator 55 in the subsequent four fields in the same manner as described above.

Referring to FIG. 11, the coincidence detection signal (k) from the comparator 55 is supplied to the trigger input terminals of the flip-flops 53 and 54. The flip-flops 53 and 54 receive the signal (i) and the signal (j), respectively, from the switching circuit 50 in response to the fall of the coincidence detection signal (k). Thus, the flip-flops 53 and 54 receive the signals (i) and (j) and provide holding signals (l) and (m), respectively, when the falling change of the error signal coincides with the average level, as shown by (l) and (m) in FIG. 8, respectively. In this case, the holding signals (l) and (m) both are signals rising to the high level with the above described timing.

The flip-flops 53 and 54 are reset in response to the low level of the detection period signal (d).

The holding signal (l) of the the flip-flop 53 and the holding signal (m) of the flip-flop 54 are selected by the switch 56. The switch 56 operates in response to the RF pulse (a) to select the signal (m) at the high level of the RF pulse (a) and to select the signal (l) at the low level of the RF pulse (a). Accordingly, in the output terminal 57 connected to the switch 56, a signal (n) as shown in FIG. 8 appears. In the other output terminal 58, a signal (o) equivalent to the RF pulse (a) appears.

The signals (n) and (o) thus obtained in the output terminals 57 and 58 are signals associated with the timing of coincidence between the falling change of the error signal (f) and the average level $V_r$, and if a control signal of the reference signal generating circuit 5 is formed based on these two signals (n) and (o), the reference signals provided from the reference signal generating circuit 5 can be made to be the most suitable reference signals for the scanned tracks of the movable heads. More specifically, according to the 2-bit ($A_0$, $A_1$) control signal comprising the signals (n) and (o), the reference signals provided from the reference signal generating circuit 5 can be made to have the frequency $f_3$ when one movable head scans on the tape and to have the frequency $f_4$ when the other movable head scans on the tape.

Returning back to FIG. 7, a concrete description will be given in the following. The 2-bit ($A_0$, $A_1$) outputs of the signals (n) and (o) provided form the output terminals 57 and 58 of the still control signal generating circuit 40 are supplied to the "L" side input terminal of the switch 30. The switch 30 is turned to the "L" side by a lapse of four fields after the start of still reproduction, since the detection period signal (d) attains the low level and accordingly the selection period signal (e) also attains the low level, as described above. Consequently, the 2-bit ($A_0$, $A_1$) control signal comprising the signals (n) and (o) is selected by the switch 30 to be supplied to the error signal forming circuit 31. As shown in FIG. 8, the signal (n) is always at the high level and the signal (o) changes for each field from the high level to the low level or from the low level to the high level. Accordingly, it can be seen from FIG. 9 that the frequencies of the reference signals generated in the reference signal generating circuit 5 based on the 2-bit ($A_0$, $A_1$) control signal comprising the signals (n) and (o) are $f_3$ and $f_4$. These reference signals $f_3$ and $f_4$ are the most suitable reference signals for such scanning loci of the movable heads as shown in FIG. 2.

At the end of the period of four fields after the start of still reproduction, the detection period signal (d) attains the low level and the switch 36 is turned to the "L" side. As a result, the error signal (f) formed based on the reference signals $f_3$ and $f_4$ together with an output of the inclination correction voltage generating circuit 33 added thereto is supplied through the switch 36 to the movable head control circuit 34, whereby the most suitable DTF control of the movable heads is accomplished.

Since the switch 37 is turned off in response to the low level of the selection signal (e), the error signal (f) is thereafter not supplied to the still control signal generating circuit 40 and, accordingly, the levels of the signals (n) and (o) provided form the circuit 40 do not change.

Although in the above described embodiment, the flip-flops 53 and 54 received the signals (i) and (j) in response to the fall of the output level of the comparator 55 (see FIG. 11) as shown in FIG. 8, the flip-flops 53 and 54 may be made to hold the signals (i) and (j) in response to the rise of the output level of the comparator 55, on the contrary. In this latter case, the levels of the signals received by the flip-flops 53 and 54 are reversed as compared with the case of the foregoing embodiment. Accordingly, as shown by the dotted lines in FIG. 11, it is necessary to interpose an inverter 60 between the switch 56 and the output terminal 57.

Figure 13:
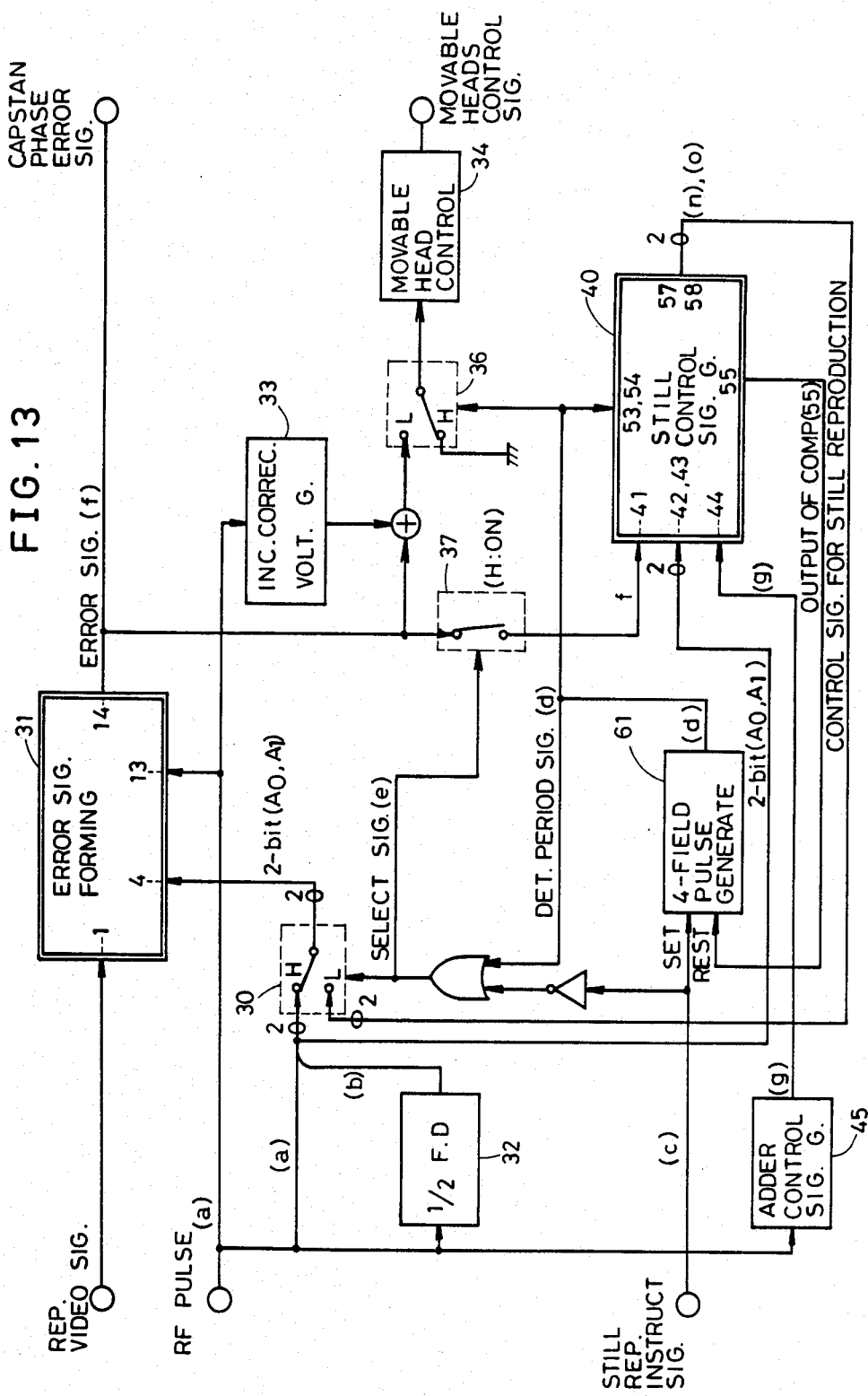
FIG. 13 is a block diagram showing a structure of a main part of another embodiment of the present invention.

FIG. 13 is a block diagram showing a structure of a main part of another embodiment of the present invention. The essential feature of the embodiment shown in FIG. 13 resides in that the period for detecting the most suitable reference signals for still reproduction is not fixed to a 4-field period and that an improvement is made to select the most suitable reference signals immediately after the detection of the reference signals. Accordingly, in this embodiment, a picture of still reproduction in the optimum conditions can be obtained more quickly.

Referring to FIG. 13, this embodiment is characterized in that the pulse generating circuit 61 is set by the still reproduction instructing signal (c) and is reset by the output of the comparator 55 (see FIG. 10) included in the still control signal generating circuit 40. The resetting may be made responsive to the fall of the output signal (k) of the comparator 55 or, on the contrary, responsive to the rise thereof.

Figure 14:
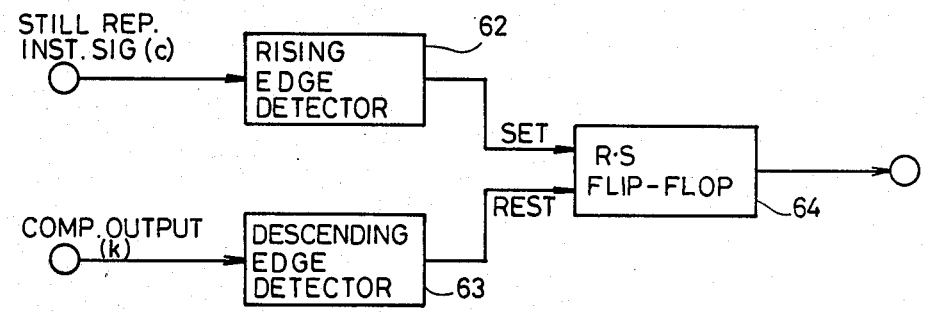
FIG. 14 shows an example of a structure of a pulse generating circuit.

FIG. 14 is a block diagram showing an example of a structure of the above mentioned pulse generating circuit 61. The pulse generating circuit 61 may be structured by: a rising edge detecting circuit 62 for detecting a rising edge of the still reproduction instructing signal (c) a falling edge detecting circuit (or a rising edge detecting circuit) 63 for detecting a falling edge (or a rising edge) of the output signal (k) of the comparator 55; and an RS flip-flop 64 where an output of the detecting circuit 62 is applied to a set input and an output of the detecting circuit 63 is applied to a reset input.

Figure 15:
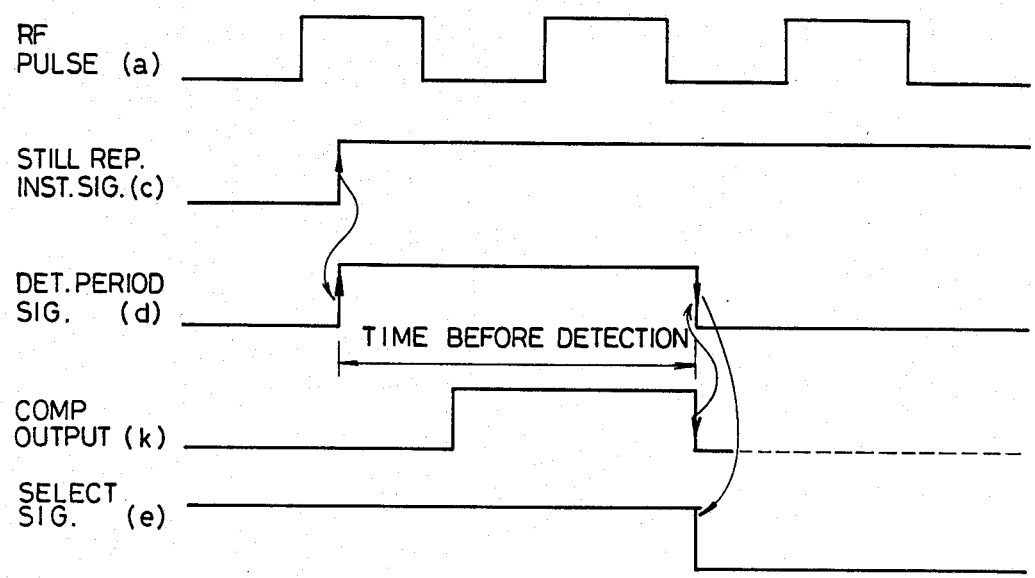
FIGS. 15 and 16 are timing charts for explaining the operation of the pulse generating circuit shown in FIG. 14.
Figure 16:
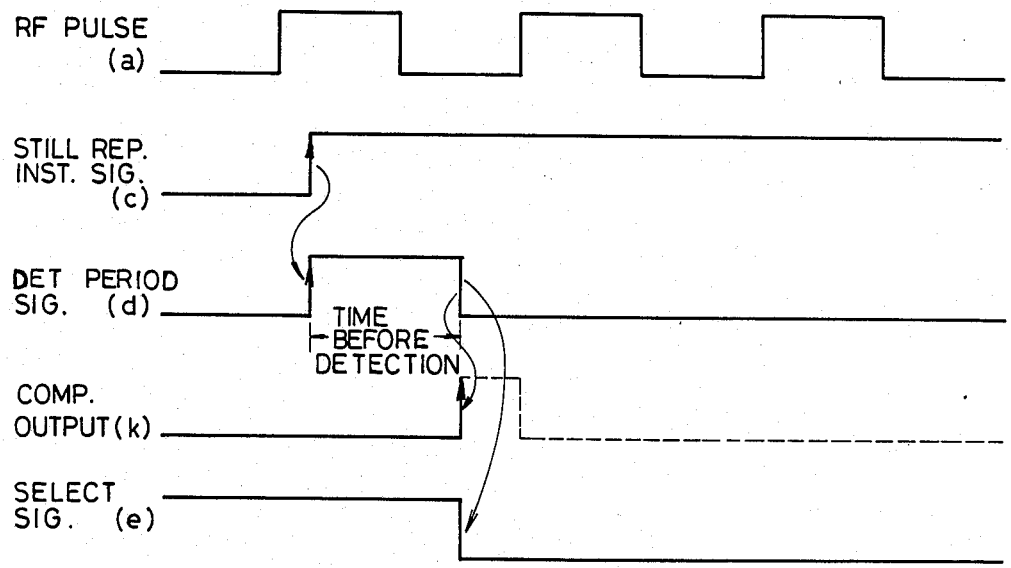

FIGS. 15 and 16 are timing charts for explaining the operation of the pulse generating circuit 61 shown in FIG. 14. FIG. 15 shows a case in which the generating circuit 61 is reset in response to the fall of the output signal of the comparator 55 and FIG. 16 shows a case in which the generating circuit 61 is reset in response to the rise thereof.

The reference characters given to the respective signal waveforms shown in FIGS. 15 and 16 are identical to those for the corresponding waveforms in FIG. 8.

As shown in FIG. 15, when the output signal k of the comparator 55 detects the point "P" and falls, the pulse generating circuit 61 (shown in FIGS. 13 and 14) is reset in response thereto and the detection period signal (d) attains the low level. Consequently, the selection signal (e) attains the low level, whereby the switch 30 shown in FIG. 14 is turned to another side.

In the same manner, in the case of FIG. 16, when the output signal (k) of the comparator 55 detects the point "Q" and rises, the pulse generating circuit 61 is reset in response thereto and the detection period signal (d) attains the low level and, consequently, the selection signal (e) also attains the low level. In this case, in the same manner as in the previously described embodiment, it is also necessary to interpose an inverter 60 as shown in the control signal generating circuit 40 (see FIG. 11).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal reproducing apparatus for reproducing by a helical scanning system, a video signal from a magnetic recording medium where said video signal and at least four kinds of pilot signals selected for each field for tracking control are recorded in an overlapping manner, comprising:

at least two reproducing heads mounted on a rotating member, said reproducing heads being enabled alternately by a head selection signal provided in response to the rotation of said rotating member;

head displacing means coupled to said reproducing heads for displacing the positions of said reproducing heads on the surface of said rotating member in the direction of the rotating axis of said rotating member;

reproduced pilot signal providing means coupled to said reproducing heads for extracting pilot signals from the signals reproduced by said reproducing heads;

reference signal providing means capable of providing successively at least four kinds of reference signals having different frequencies in response to said head selection signal, the frequencies of said four kinds of reference signals being selected to be equal to the frequencies of said four kinds of pilot signals, respectively;

error signal providing means coupled to said reproduced pilot signal providing means and said reference signal providing means for providing an error signal for controlling the tracing positions of said reproducing heads with respect to said recording medium based on the outputs of said reproduced pilot signal providing means and said reference signal providing means;

detection period signal providing means for providing a detection period signal at the time of starting still reproduction;

head position control forbidding means coupled to said head displacing means and said detection period signal providing means for forbidding the control of said head displacing means in response to said detection period signal;

level detection signal providing means coupled to said error signal providing means and said detection period signal providing means for observing said error signal changing during the application of said detection period signal and for providing a level detection signal when said error signal attains the optimum prescribed level for tracing control; and reference signal control means coupled to said level detection signal providing means and said reference signal providing means for controlling said reference signal providing means in response to said level detection signal so as to provide references signals suited for the scanned tracks at the time of still reproduction.

2. A video signal reproducing apparatus in accordance with claim 1, wherein said detection period signal is provided during a predetermined period.

3. A video signal reproducing apparatus in accordance with claim 2, wherein said predetermined period is a period continued untill said level detection signal is provided.

4. A video signal reproducing apparatus in accordance with claim 2, wherein said predetermined period is a period of "n" fields, "n" being a prescribed integer equal to the number of kinds of said pilot signals, namely, 4 or more.

5. A video signal reproducing apparatus in accordance with claim 4, wherein said integer n is four.

6. A video signal reproducing apparatus in accordance with claim 1, wherein
said prescribed level at which said level detection signal is provided is a zero cross between said error signal and an error signal average level.

7. A video signal reproducing apparatus in accordance with claim 6, further comprising:
zero level setting means, the zero level set by said zero level setting means being an average level of said error signal.

8. A video signal reproducing apparatus in accordance with claim 6, wherein said zero cross is a zero cross caused at the fall of said error signal.

9. A video signal reproducing apparatus in accordance with claim 6, wherein
said reference signal control means selects upon detection of said zero cross, a field close in time to said zero cross, out of the fields adjacent to a field containing said zero cross, whereby two reference signals equivalent to the pilot signals recorded in said field containing said zero cross and in said selected close field are determined as the reference signals suited for still reproduction.

* * * * *